(12) United States Patent
Rodriguez et al.

(10) Patent No.: US 7,334,251 B2
(45) Date of Patent: Feb. 19, 2008

(54) MANAGEMENT OF TELEVISION ADVERTISING

(75) Inventors: Arturo A. Rodriguez, Norcross, GA (US); John Eric West, Roswell, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 10/073,842

(22) Filed: Feb. 11, 2002

(65) Prior Publication Data

US 2003/0154475 A1    Aug. 14, 2003

(51) Int. Cl.
*H04N 5/455*    (2006.01)
*H04N 7/173*    (2006.01)

(52) U.S. Cl. .............. 725/42; 725/44; 725/45; 725/47; 725/100

(58) Field of Classification Search ............ 725/32–36, 725/42, 46, 44, 52, 100, 131, 139, 151; 715/720; 705/14, 26
See application file for complete search history.

(56) References Cited

U.S. PATENT DOCUMENTS

| | | | |
|---|---|---|---|
| 4,751,578 A | 6/1988 | Reiter et al. | 358/183 |
| 5,740,549 A | 4/1998 | Reilly et al. | 705/14 |
| 5,913,040 A | 6/1999 | Rakavy et al. | 395/200.62 |
| 6,148,332 A | 11/2000 | Brewer et al. | 709/218 |
| 6,282,713 B1 * | 8/2001 | Kitsukawa et al. | 725/36 |
| 6,314,572 B1 * | 11/2001 | LaRocca et al. | 725/60 |
| 6,314,573 B1 * | 11/2001 | Gordon et al. | 725/61 |
| 6,405,239 B1 * | 6/2002 | Addington et al. | 709/203 |
| 6,463,585 B1 * | 10/2002 | Hendricks et al. | 725/35 |
| 6,507,949 B1 * | 1/2003 | Jonason et al. | 725/22 |
| 6,574,793 B1 * | 6/2003 | Ngo et al. | 725/32 |
| 6,684,400 B1 * | 1/2004 | Goode et al. | 725/61 |
| 6,735,572 B2 * | 5/2004 | Landesmann | 705/14 |
| 6,771,290 B1 * | 8/2004 | Hoyle | 715/745 |
| 6,847,969 B1 * | 1/2005 | Mathai et al. | 707/100 |
| 6,898,762 B2 * | 5/2005 | Ellis et al. | 715/716 |
| 6,968,372 B1 * | 11/2005 | Thompson et al. | 709/223 |
| 7,062,466 B2 * | 6/2006 | Wagner et al. | 705/51 |
| 7,076,734 B2 * | 7/2006 | Wolff et al. | 715/720 |
| 2002/0062481 A1 * | 5/2002 | Slaney et al. | 725/42 |
| 2003/0101451 A1 * | 5/2003 | Bentolila et al. | 725/34 |
| 2003/0101454 A1 * | 5/2003 | Ozer et al. | 725/42 |

FOREIGN PATENT DOCUMENTS

| | | |
|---|---|---|
| EP | 0680214 | 2/1995 |
| WO | WO 99/66719 | 6/1999 |
| WO | WO 00/49801 | 8/2000 |
| WO | WO 01/24067 | 4/2001 |

* cited by examiner

Primary Examiner—Kieu-Oanh Bui (57) ABSTRACT

A method for providing television advertising includes receiving user input for selecting an advertising parameter and providing a user with an advertisement corresponding to the advertising parameter.

24 Claims, 11 Drawing Sheets

MANAGEMENT OF TELEVISION ADVERTISING

FIELD OF THE INVENTION

This invention relates in general to television systems, and more particularly, to the field of subscriber television systems.

BACKGROUND OF THE INVENTION

Cable television systems are now capable of providing many services in addition to analog broadcast video. In implementing enhanced programming, the home communication terminal ("HCT"), otherwise known as the settop box, has become an important computing device for accessing various video services. In addition to supporting traditional analog broadcast video finctionality, digital HCTs (or "DHCTs") now also support an increasing number of two-way digital services such as video-on-demand.

A DHCT is typically connected to a cable or satellite television network and includes hardware and software necessary to provide various services and functionality. Preferably, some of the software executed by a DHCT is downloaded and/or updated via the cable television network. Each DHCT also typically includes a processor, communication components and memory, and is connected to a television or other display device. While many conventional DHCTs are stand-alone devices that are externally connected to a television, a DHCT and/or its functionality may be integrated into a television or personal computer, as will be appreciated by those of ordinary skill in the art.

A DHCT provides users with television programming and television advertising. Many DHCT users, however, often avoid viewing television advertisements. Television advertisements may be avoided in a number of ways including, for example, by switching television channels during an advertisement or by recording a television program and then using trick mode functionality to skip recorded advertisements. One reason for why a viewer may avoid viewing an advertisement is because the viewer may not be interested in the product or service being advertised. Advertisement avoidance results in lower advertisement exposure for advertisers and, therefore, in lower potential revenue for television service providers. Therefore, there is a need for systems and methods for increasing the viewing of television advertisements.

BRIEF DESCRIPTION OF THE DRAWINGS

The invention can be better understood with reference to the following drawings. The components in the drawings are not necessarily drawn to scale, emphasis instead being placed upon clearly illustrating the principles of the present invention. In the drawings, like reference numerals designate corresponding parts throughout the several views.

DETAILED DESCRIPTION OF THE PREFERRED EMBODIMENTS

Systems and methods are provided herein for managing the presentation of television advertisements. As a non-limiting example, among others, a television advertisement may be an audio/video television commercial. In one embodiment of the invention, a DHCT receives user input for selecting an advertisement or type of advertisement, and then presents the user with an advertisement that corresponds to the user's selection. The advertisement may be presented to the user immediately after the user's selection or may be presented to the user at subsequent times during interruptions in television broadcast presentations.

In another embodiment, a DHCT may keep track of the number of times that an advertisement is presented to a user in order to determine whether the advertisement is to continue being presented. The DHCT may also keep track of the total number of advertisements that have been presented over a predetermined period of time in order to determine whether to present an additional advertisement at a current time.

In yet another embodiment of the invention, an advertisement or type of advertisement is assigned a value by a system operator. A user may then select advertisements and/or types of advertisements based their respective assigned values as shown via an advertisement selection screen. A DHCT may then manage the presentation of advertisements based on their individual and/or cumulative values. As a non-limiting example, the frequency and/or duration of an advertisement or plurality of advertisements may be inversely correlated to the value of the advertisement(s).

The preferred embodiments of the present invention now will be described more fully hereinafter with reference to the accompanying drawings. These embodiments are examples, among others, of systems and methods of the present invention. Therefore, the present invention, which may be embodied in many different forms, should not be construed as limited to the embodiments set forth herein.

Figure 1:
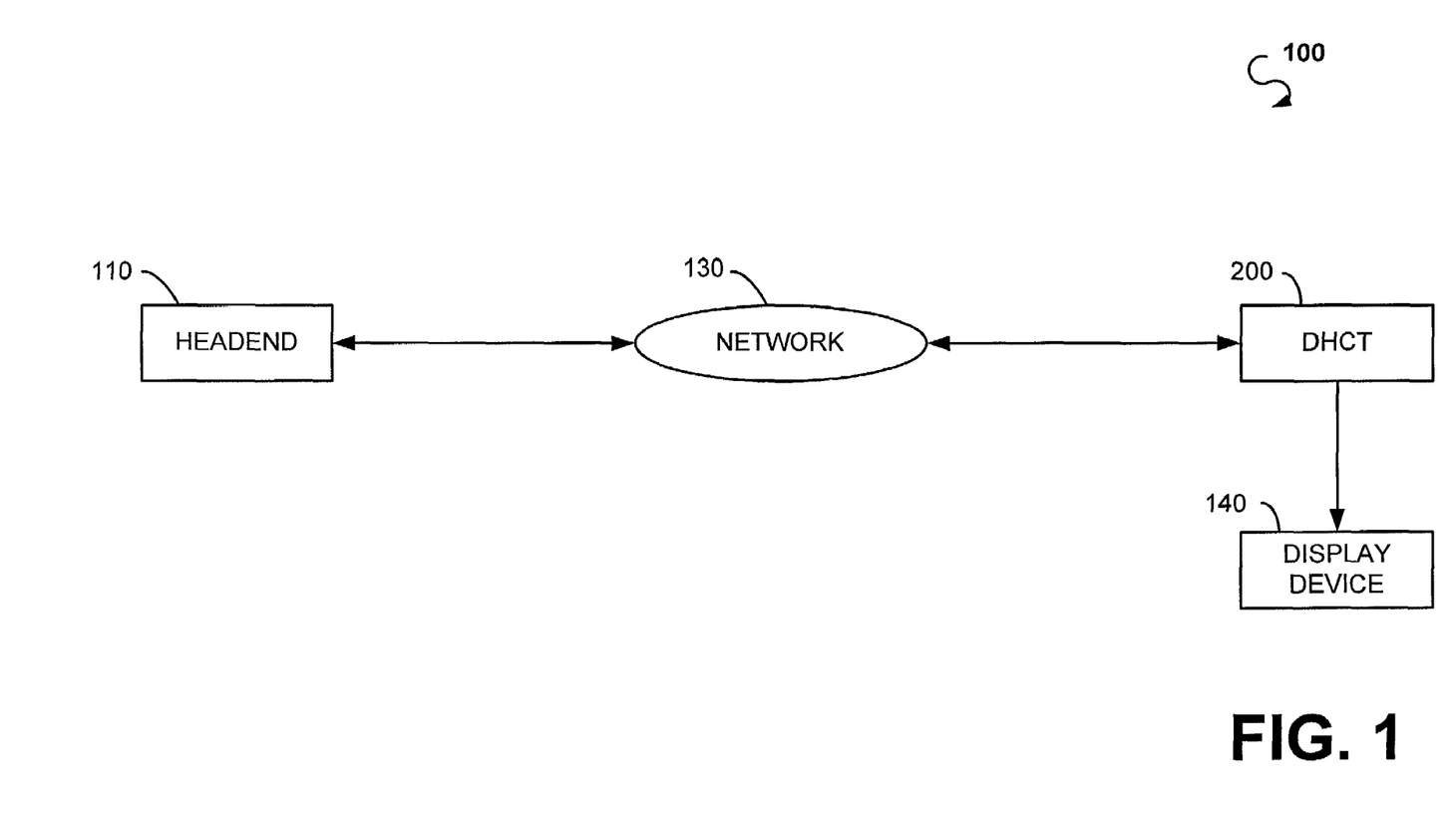
FIG. 1 is a block diagram depicting a non-limiting example of a television services system.

FIG. 1 is a block diagram depicting a non-limiting example of a television services system 100. In this example, the television services system 100 includes a headend 110 and a DHCT 200 that are coupled via a network 130. The DHCT 200 is typically situated at a user's residence or place of business and may be a stand-alone unit or integrated into another device such as, for example, the television 140 or a personal computer (not shown). The DHCT 200 receives signals (video, audio and/or other data) from the headend 110 through the network 130 and provides any reverse information to the headend 110 through the network 130. The network 130 may be any suitable means for communicating television services data including, for example, a cable television network, a public switched telephone network (PSTN), a satellite communication network, the internet, etc. The headend 110 may include one or more server devices (not shown) for providing video, audio, and textual data to client devices such as DHCT 200. The headend 110 and the DHCT 200 cooperate to provide a user with television services including, for example, television programs, an interactive program guide (IPG), and/or video-on-demand (VOD) presentations. The television services may be provided via a television 140. Alternatively, the DHCT 200 may provide television services via a display device other than the television 140.

In one embodiment of the invention, an advertising counter may be used to track a number of times that a television advertisement is presented by a DHCT 200. In one implementation, an advertisement continues to be presented via a DHCT 200 until it has been presented a predetermined number of times via the DHCT 200 or via a plurality of DHCTs. If the advertisement is stored in a DHCT 200, then it may be deleted from the DHCT 200 after it is presented a predetermined number of times. An "electronic advertisement information" (EAI) database 228 may be used to keep track of advertisements that are to be stored in or deleted from a DHCT 200. If the advertisement is stored at the headend 110, then the headend 110 may discontinue broadcasting the advertisement after it is presented a predetermined number of times. For example, a certain advertisement may be deleted or discontinued after it is presented 10 times by a single DHCT 200 and/or after it is presented 15,000 times by a group of DHCTs. In one possible implementation, the advertising counter in a DHCT 200 may track the number of times that an advertisement is presented to a user or a group of users of a particular DHCT 200 by soliciting certain user input during, before, or after the presentation of the advertisement and then determining if the solicited input is received. In another implementation, the advertising counter may track the number of times that an advertisement is presented to a user based on whether the television 140 is turned on while the advertisement is being presented by the DHCT 200; if the television is not turned on, then the counter is not incremented. In one possible implementation, a television may be determined to be turned on if certain user input related to the operation of the television (e.g., volume control, channel navigation, among others) had been received by the DHCT 200 within a preceding predetermined period of time.

In another embodiment, a television advertisement continues to be presented intermittently via a DHCT 200 until it has been presented a predetermined number of times via the DHCT 200 or until an expiration date. In yet another embodiment, an advertisement is only shown during enabled viewing periods associated with the advertisement and/or according to the program category that the viewer is watching at a current time. Hence, an advertisement may feature a set of flags in an EAI database record that indicates when the respective advertisement is enabled for viewing. For example, a car or truck advertisement may be enabled for viewing during periods when a sports or news program is being watched and/or during certain times of the day. The enabled viewing periods occur between the advertisement's introduction date and the advertisement's expiration date. The enabled viewing periods, the introduction date, and the expiration date may be received from the headend 110 and stored in the EAI database 228 in DRAM 220.

A enabled viewing period associated with a television advertisement may have a recurring schedule such as, for example, among others, a daily recurring schedule and/or a weekly recurring schedule. As a non-limiting example, liquor or beer advertisements may have enabled viewing periods of 9:00 p.m. to 5:00 a.m. during weekdays and 2:00 p.m. to 5:00 a.m. during weekend days (weekly recurring schedule); adult movies and products advertisements may have enabled viewing periods from 10:00 p.m. to 5:00 a.m. every day (daily recurring scheduled); and football advertisements may have enabled viewing periods from 1:00 p.m. to 6:00 p.m. on weekend days only (weekly recurring schedule).

In another embodiment of the invention, a user is presented with an advertisement that corresponds to an advertisement or type of advertisement that is selected by the user. An advertisement or type of advertisement may be selected by a user significantly in advance (e.g., an hour, a day, a week, a month, or a year in advance) and/or immediately prior to the presentation of a corresponding advertisement. Furthermore, an advertisement selection screen may be provided to a user in response to user input and/or during an advertisement interruption in a television broadcast presentation. Selection options in an advertisement selection screen may be retrieved from the EAI database 228.

In yet another embodiment of the invention, an advertisement is associated with a value or weight. The DHCT 200 may keep track of the total value of the advertisements that are presented via DHCT 200 based on the value of the individual advertisements that are presented. For example, if the DHCT 200 presents ten advertisements having a value of 1, ten advertisements having a value of 2, and ten advertisements having a value of 3 over a certain period of time, then the total value of the advertisements presented over that period of time is equal to 60.

A user may be informed of the value of each of a plurality of advertisements and/or types of advertisements and may be provided with an option of selecting the advertisements and/or types of advertisements that the user desires to watch. In one implementation, the higher the total value of advertisements that are presented to a user over a certain period of time, the less the total number and/or duration of advertisements will be. For example, a user who is presented with advertisements having a total value of 1V may be presented with advertisements having a total duration of 2T, and another user who is presented advertisements having a value of 2V may be presented with advertisements having a total duration of 1T, where V represents a certain total value and T represents a certain total duration. Although the total value of advertisements presented over a certain period of time may be inversely correlated to the total duration of the advertisements, the correlation coefficient is not necessarily −1. In this manner, a Multiple System Operator (MSO) may assign values to advertisements based on the levels of advertisement exposure that are desired by the respective advertisers. An MSO may charge advertisers based on the value that is associated with their respective advertisements and/or based on the estimated number of times that their respective advertisements are presented to viewers via DHCTs that receive the MSO's television programming. In one implementation, an estimated number of times that an advertisement is presented to a user may be based on user inputs that are received by the DHCTs confirming that the advertisement has been, is being, and/or will be viewed.

Figure 2:
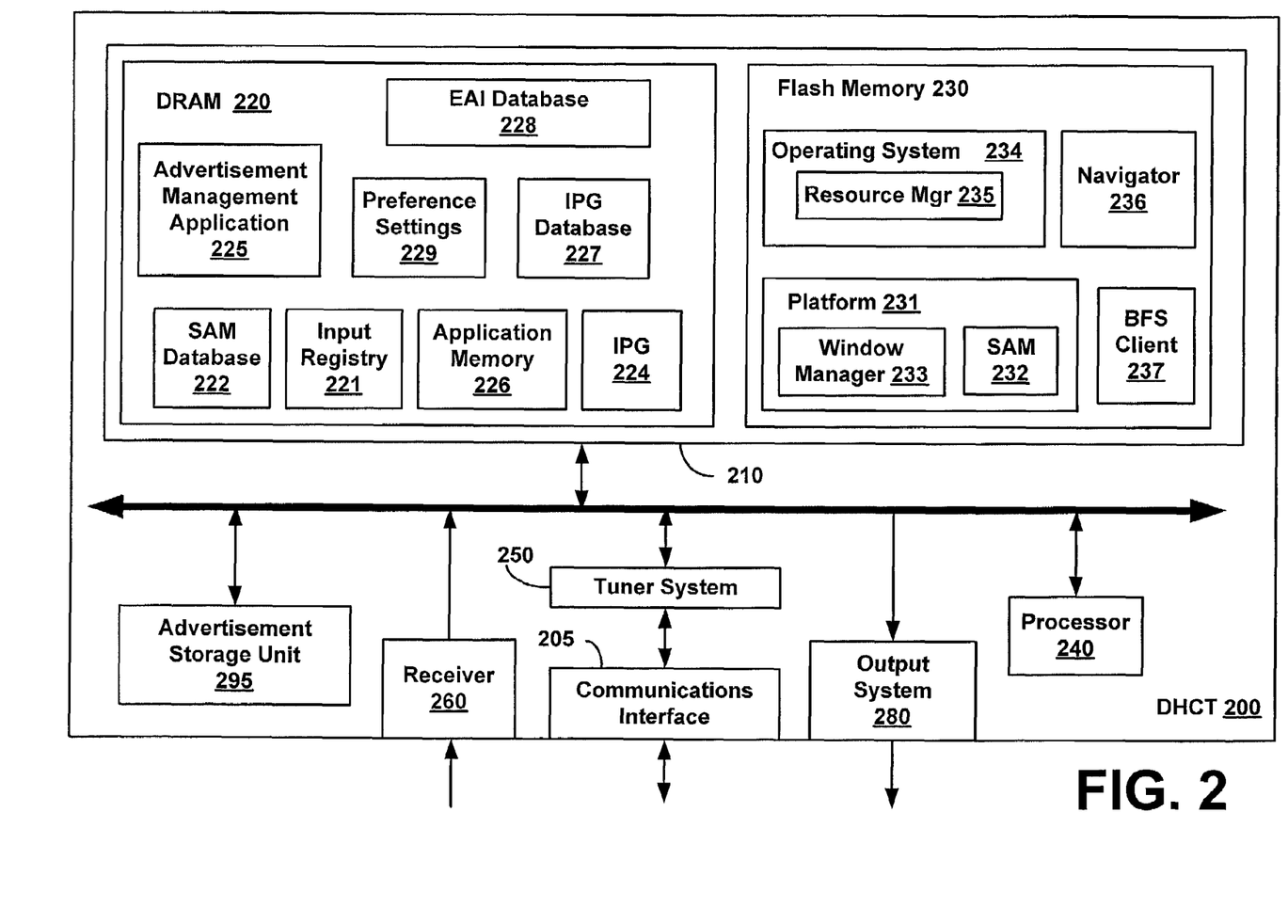
FIG. 2 is a block diagram depicting a non-limiting example of the internal configuration of the DHCT depicted in FIG. 1.

FIG. 2 is a block diagram depicting a non-limiting example of a DHCT 200. The DHCT 200 described herein is merely illustrative and should not be construed as implying any limitations upon the scope of the present invention. In an alternative embodiment, the DHCT 200 may have different, fewer, or additional components than those shown in FIG. 2. The DHCT 200 includes a communications interface 205 for receiving signals (video, audio and/or other data) from the headend 110, at least one processor 240 for controlling operations of the DHCT 200, an output system 280 for driving the television 140, and a tuner system 250 for tuning to a particular television channel to be displayed. The tuner system 250 includes, in one implementation, an out-of-band tuner for bi-directional quadrature phase shift keying (QPSK) data communication and a quadrature amplitude modulation (QAM) tuner for receiving television signals and data. Data received via either tuner may comprise electronic program information and/or EAI data. A receiver 260 receives externally-generated user inputs or commands from an input device such as, for example, a remote control device.

The DHCT 200 may include one or more wireless or wired interfaces (not shown), also called ports, for receiving and/or transmitting data to other devices. For instance, the DHCT 200 may feature a USB (Universal Serial Bus), an Ethernet port (for connection to a computer), an IEEE-1394 connection (for connecting to consumer electronics equipment), a serial port, a parallel port, a radio frequency (RF) interface, and/or an infra-red (IR) interface. In this manner, user inputs may be provided via, for example, a personal computer, buttons or keys located on the exterior of the DHCT 200, a hand-held remote control device, and/or a keyboard that includes user-actuated keys, etc.

The DHCT 200 may include an advertisement storage unit 295 for storing advertisements. Stored advertisements are generally referred to herein as advertisement clips or advertisement media streams. The storage unit 295 may incorporate electronic, magnetic, optical, and/or other types of storage media. An advertisement management application 225 may be used for managing advertisements, including managing content stored in the storage unit 295. Advertisements may be received from a headend 110 (FIG. 1) and stored in the storage unit 295 based on instructions contained in the advertisement management application 225. Electronic advertisement information, or EAI data, associated with stored advertisements may be stored in DRAM 220 or in storage unit 295. Although shown as residing within the DHCT 200, the storage unit 295 may alternatively be located outside the DHCT 200 and coupled thereto using a wired or wireless connection. In an alternative embodiment, an advertisement storage unit 295 is not used in connection with the DHCT 200, in which case, an advertisement may be presented to a user as it is being received from the headend 110.

System memory 210 includes flash memory 230 and dynamic random access memory (DRAM) 220 for storing various applications, modules and data for execution and use by the processor 240. Basic functionality of the DHCT 200 is provided by an operating system 234 that is primarily stored in flash memory 230. The operating system 234 includes at least one resource manager 235 that provides an interface to and coordination of resources of the DHCT 200 such as, for example, computing resources.

One or more programmed software applications, herein referred to as applications, are executed by utilizing the computing resources in the DHCT 200. Applications stored in flash memory 230 or DRAM 220 are executed by processor 240 under the auspices of the operating system 234. Data required as input by an application is stored in DRAM 220 or flash memory 230 and read by processor 240 as needed during the course of the application's execution. Input data may be data stored in DRAM 220 by a secondary application or other source, either internal or external to the DHCT 200, or possibly anticipated by the application and thus created with the application at the time it was generated as a software application, in which case it is stored in flash memory 230. Data generated by an application is stored in DRAM 220 by processor 240 during the course of the application's execution.

An application referred to as navigator 236 is also resident in flash memory 230 and provides a navigation framework for services provided by the DHCT 200. The navigator 236 registers for and in some cases reserves certain user inputs related to navigational keys such as television channel up/down, last television channel, favorite television channel, etc. The client applications may be resident in flash memory 230 or downloaded into DRAM 220.

The flash memory 230 also contains a platform library 231. The platform library 231 is a collection of utilities useful to applications, such as a timer manager, a compression manager, a configuration manager, an HTML parser, a database manager, a widget toolkit, a stnng manager, and other utilities (not shown). These utilities are accessed by applications via application programming interfaces (APIs) as necessary so that each application does not have to contain these utilities. Two components of the platform library 231 that are shown in FIG. 2 are a window manager 233 and a service application manager (SAM) client 232.

The window manager 233 provides a mechanism for implementing the sharing of the screen regions and user input. The window manager 233 is also responsible for, as directed by one or more applications, implementing the creation, display, and allocation of the limited DHCT 200 screen resources. Window manager 233 allows multiple applications to share the screen by assigning ownership of screen regions, or windows. Window manager 233 communicates with resource manager 235 to coordinate available resources (such as display memory) among different resource-consuming processes. Such processes may be directly or indirectly invoked by one or more applications.

The window manager 233 also maintains, among other things, a user input registry 221 in DRAM 220 so that when a user enters a key or a command via a remote control device or another input device such as a keyboard or mouse, the user input registry 221 may be accessed to determine which of various applications running on the DHCT 200 should receive data corresponding to the input key and in which order. As an application is executed, it registers a request to receive certain user input keys or commands. When the user presses a key corresponding to one of the commands on the remote control device, the command is received by the receiver 260 and relayed to the processor 240. The processor 240 dispatches the event to the operating system 234 where it is forwarded to the window manager 233. The window manager 233 then accesses the user input registry 221 and routes data corresponding to the incoming command to the appropriate application.

The SAM client 232 is a client component of a client-server pair of components, with the server component being located on the headend 110 (FIG. 1). A SAM database 222 in DRAM 220 includes a data structure of services and a data structure of television channels that are created and updated by the headend 110. Many television services can be defined using the same application component, with different parameters. Television services include, without limitation and in accordance with one implementation, the presentation of television broadcast programs, video-on-demand (VOD), and interactive program guides (IPG). In general, the identification of a service includes the identification of an executable application that provides the service along with a set of application-dependent parameters that indicate to the application the service to be provided. As a non-limiting example, a service of presenting a television program could be executed with a set of parameters to view HBO or with a separate set of parameters to view CNN. Each association of the application component (tune video) and one parameter component (HBO or CNN) represents a particular service that has a unique service I.D.

Application clients can be downloaded into DRAM 220 at the request of the SAM client 232, typically in response to a request by the user or in response to a message from the headend. In this non-limiting example, DRAM 220 contains an interactive program guide (IPG) application 224 and an advertisement management application 225. The IPG application 224 may use IPG data stored in IPG database 227 to determine a program's category prior to creating and presenting a graphical user interface containing program information sorted by category. Similarly, the advertisement management application 225 may use EAI data stored in an EAI database 228 to select and present an advertisement based on a desired advertisement category previously selected by a user. It should be clear to one with ordinary skill in the art that these applications are not limiting and merely serve as examples for an embodiment of the invention. Furthermore, one or more DRAM based applications may, as an alternative embodiment, be resident in flash memory 230. These applications, and others provided by a television services system operator, are software entities for providing services to the user.

A broadcast file system (BFS) client 237 has a counterpart BFS server module (not shown) located at the headend 110. The BFS server repeatedly sends data that is received by the BFS client 237 and stored in DRAM 220. The data is sent on a data carousel over a period of time in cyclical repeated manner so that applications on a DHCT 200 can use the data as needed. For example, a BFS server may repeatedly send current IPG data and/or IPG data updates so that an IPG application 224 is able to provide a user with current television program listings. Likewise, a BFS server may repeatedly send current EAI data and/or EAI data updates so that advertisement management application 225 is able to present a user with updated and current advertisement information. The DHCT 200 may receive EAI data via an out-of-band channel or an in-band channel. Furthermore, EAI data may be received by the DHCT 200 as MPEG private data in an MPEG transport stream.

Advertisement management application 225 receives a plurality of media types that serve as television advertisements. Among others, a first type of advertisement comprises graphical and/or textual information that is overlaid on a displayed video picture. A second type of advertisement comprises video data that is displayed in a full-screen format or in a downscaled video window. A third type of advertisement comprises audio data. A fourth type of advertisement comprises a combination of graphical, textual, audio, and/or video data.

A television advertisement may be packaged into a file and may be delivered to DHCT 200 via the BFS delivery mechanism. An advertisement that is received by a DHCT 200 may either be displayed immediately upon receipt or may be stored in the advertisement storage unit 295 for presentation at a later time. In one embodiment of the invention, a DHCT 200 receives an advertisement file that is broadcast by the BFS regardless of whether the advertisement corresponds to a user preference. In an alternative embodiment, a DHCT 200 only receives advertisement files that correspond to a user preference. For instance, subscribers that have indicated via preferences identified by the advertisement preference settings 229 that they wish to receive and view advertisements related to baby products, may receive BFS files corresponding to baby product advertisements whereas other subscribers may not. Advertisement preference settings 229 are preferably stored in DRAM 220, but may also be stored in non-volatile memory so that they may be retrieved in case of a power outage. The non-volatile memory may be flash memory 230 or memory that is external to the DHCT 200 such as, for example, the headend 110 or a storage device (not shown) that is coupled to the DHCT 200. Advertisement management application 225 interprets advertisement preferential settings stored in DRAM 220 and, in communication with BFS client 237, effects the opening of desired advertisement files on a periodic basis. Each advertisement category may be assigned a respective sub-directory. A DHCT 200 may open an advertisement category's sub-directory upon receiving a message from the headend 110 that an update to the advertisement category has occurred.

In one implementation, applications executing on the DHCT 200 work with the navigator 236 by abiding by several guidelines. First, an application utilizes the SAM client 232 for the provision, activation, and suspension of services and service enhancements. Second, an application shares DHCT 200 resources with other applications and abides by the resource management policies of the SAM client 232, the operating system 234, and the DHCT 200. Third, an application conforms to situations where shared resources are only accessible via the navigator 236. Fourth, when an application loses service authorization while providing a service, the application suspends the service via the SAM client 232 (the navigator 236 will reactivate an individual service application when it later becomes authorized). Finally, an application client is designed to not have access to certain user input keys reserved by the navigator 236 (e.g., power, channel +/−, volume +/−, etc.).

Data and software used in providing a DHCT service to a user may be stored in one or more of the following memory resources: a data storage device located at a headend, a data storage device located at a customer premises, a non-volatile memory internal to the DHCT 200, and/or a hard drive internal to the DHCT 200. For example, an executable program or algorithm corresponding to an operating system (OS) component, or to a client platform component, or to a client application (e.g. IPG application 224), or to respective parts thereof, may reside in and/or execute out of DRAM 220 and/or flash memory 230, or may reside in a local storage device connected to DHCT 200 and may be transferred into DRAM 220 for execution. Likewise, data input for an executable program or algorithm may reside in DRAM 220 or in flash memory 230, or may reside in a local storage device connected to the DHCT 200 and may be transferred into DRAM 220 for use by an executable program or algorithm. In addition, data output by an executable program or algorithm may be written into DRAM 220 by the executable program or algorithm and may be transferred to flash memory 230 or to a local storage device for storage purposes. It should be noted, however, that the present invention is not limited by where or how any data and/or applications are stored or retrieved.

Each of the above mentioned applications comprises executable instructions for implementing logical functions and can be embodied in any computer-readable medium for use by or in connection with an instruction execution system, apparatus, or device, such as a computer-based system, processor-containing system, or other system that can fetch and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner, and then stored in a computer memory.

Figure 3:
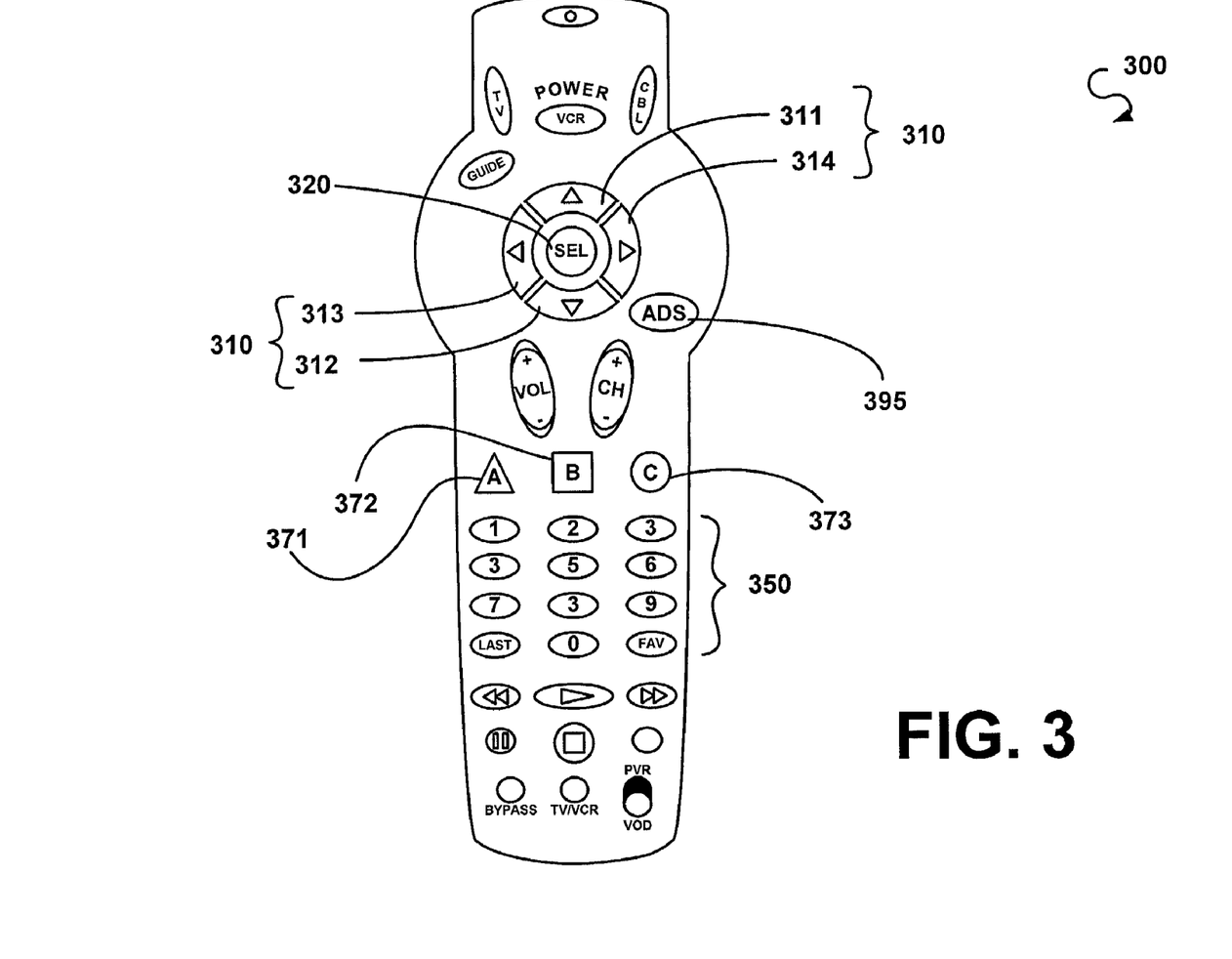
FIG. 3 depicts a non-limiting example of a remote control device that may be used to provide user input to the DHCT depicted in FIG. 2.

FIG. 3 depicts a non-limiting example of a remote control device 300 that may be used to provide user input to the DHCT 200. The remote control device 300 described herein is merely illustrative and should not be construed as implying any limitations upon the scope of the present invention. Four arrow keys 310 are provided including an up arrow key 311, a down arrow key 312, a left arrow key 313, and a right arrow key 314. The arrow keys 310 can be used to scroll through on-screen options and/or to highlight an on-screen option, whereas the select key 320 may be used to select a currently highlighted option. The advertisements key 395 may be used to request an advertisement or an advertisement selection menu. The function of the "A" key 371, the "B" key 372, and the "C" key 373 varies depending on the screen being presented to a user at the time of a key's activation. In one embodiment, the "A" key 371 can be used to access a browse-by list for requesting an IPG screen that contains a subset of television programs falling under a user selected browse-by category such as, for example, comedy, drama, action/adventure, sports, etc.; the "B" key 372 can be used to request an IPG screen containing program listings for a user selected date; and the "C" key 373 can be used to request an IPG that covers a time period that includes the current time.

In an alternative embodiment of the invention, different and/or additional systems and methods of providing user input may be used including, for example, a remote control device having different keys and/or key layouts, a keyboard device, a mouse, a voice activated input system, a touch-screen display, etc. The invention described herein is not limited by the type of device used to provide user input.

FIGS. 4-8 depict non-limiting examples of screens that may be used for selecting an advertisement or type of advertisement. It should become apparent to one skilled in the art in light of the following descriptions that additional, different, and/or fewer selections screens may be used in an alternative embodiment of the present invention.

Figure 4:
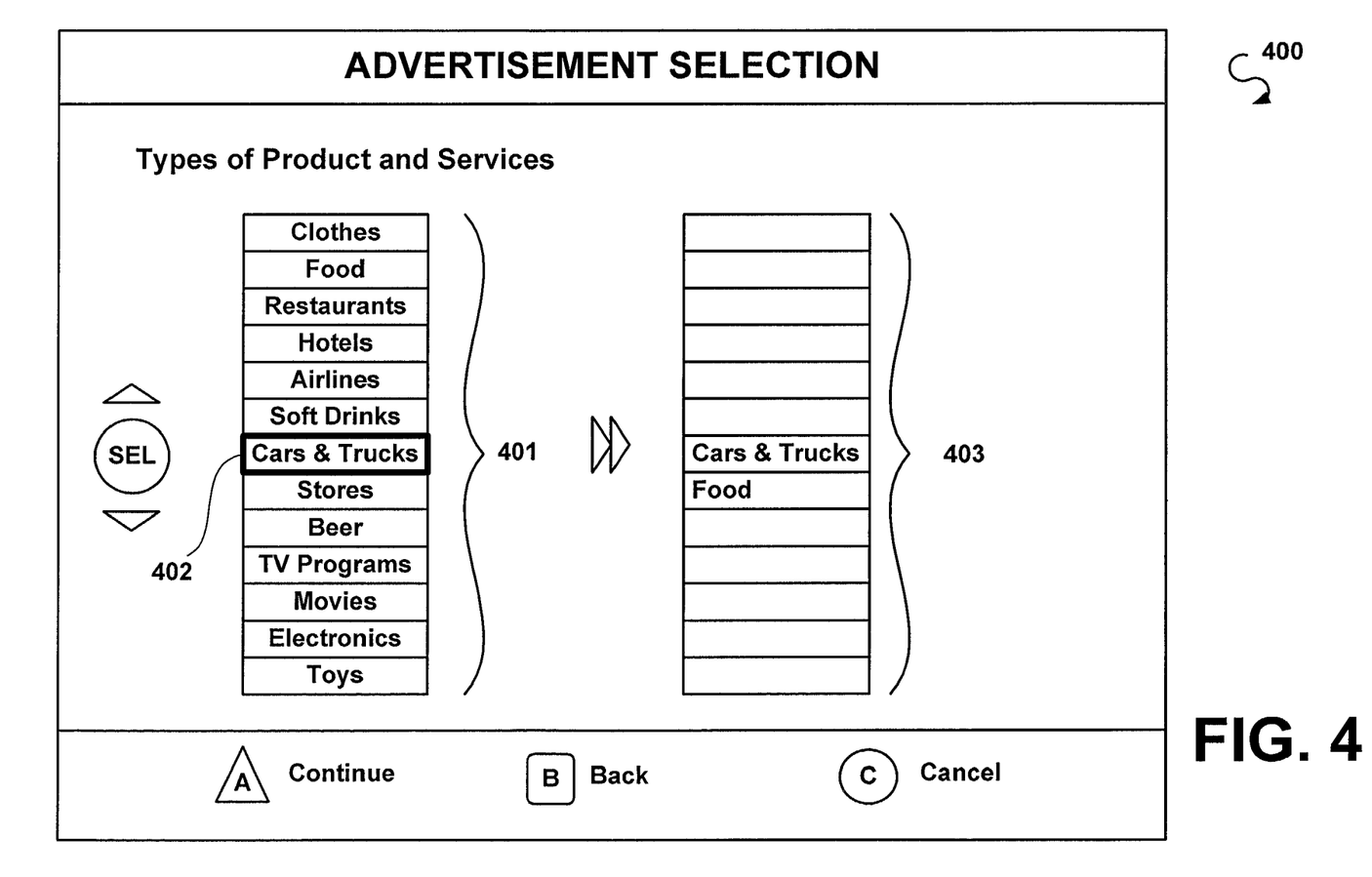
FIG. 4 depicts a non-limiting example of an advertisement category selection screen which may be provided in response to user input such as, for example, the activation of the "ADS" key depicted in FIG. 3.

FIG. 4 depicts a non-limiting example of an advertisement category selection screen 400 which may be provided in response to user input such as, for example, the activation of the "ADS" key 395 (FIG. 3). An advertisement category menu 401 includes advertising category options corresponding to categories of products and services that may be advertised via the DHCT 200. Advertising category options may include, for example, clothes, food, restaurants, hotels, airlines, softdrinks, cars & trucks, stores, beer, TV programs, movies, electronics, baby products, and toys (among others). In another embodiment of the invention, a television advertisement category selection menu 401 may contain fewer, additional, or different advertisement category options such as, for example, make-up, kitchen products, household products, furniture, health products, and VOD movies, etc. The advertisement category options may be used to determine user preferences regarding advertisements. A user may use the arrow keys 310 (FIG. 3) in order to highlight an option or to access additional options by scrolling up or down the advertisement category menu. The select key 320 may be used to select a currently highlighted option. An advertisement category option that is selected from the television advertisement category menu is added to an active selection list 403. After the user selects the desired advertisement categories, the user can provide additional input via the remote control 300 in order to confirm the selections. Such input may be provided via, for example, activation of the "A" key 371 (FIG. 3). User selections of on-screen options shown in other screen depictions may also be performed in a similar manner. However, the selection of any of the on-screen options discussed herein may alternatively be performed in a different manner including for example, the use of different user input devices.

Figure 5:
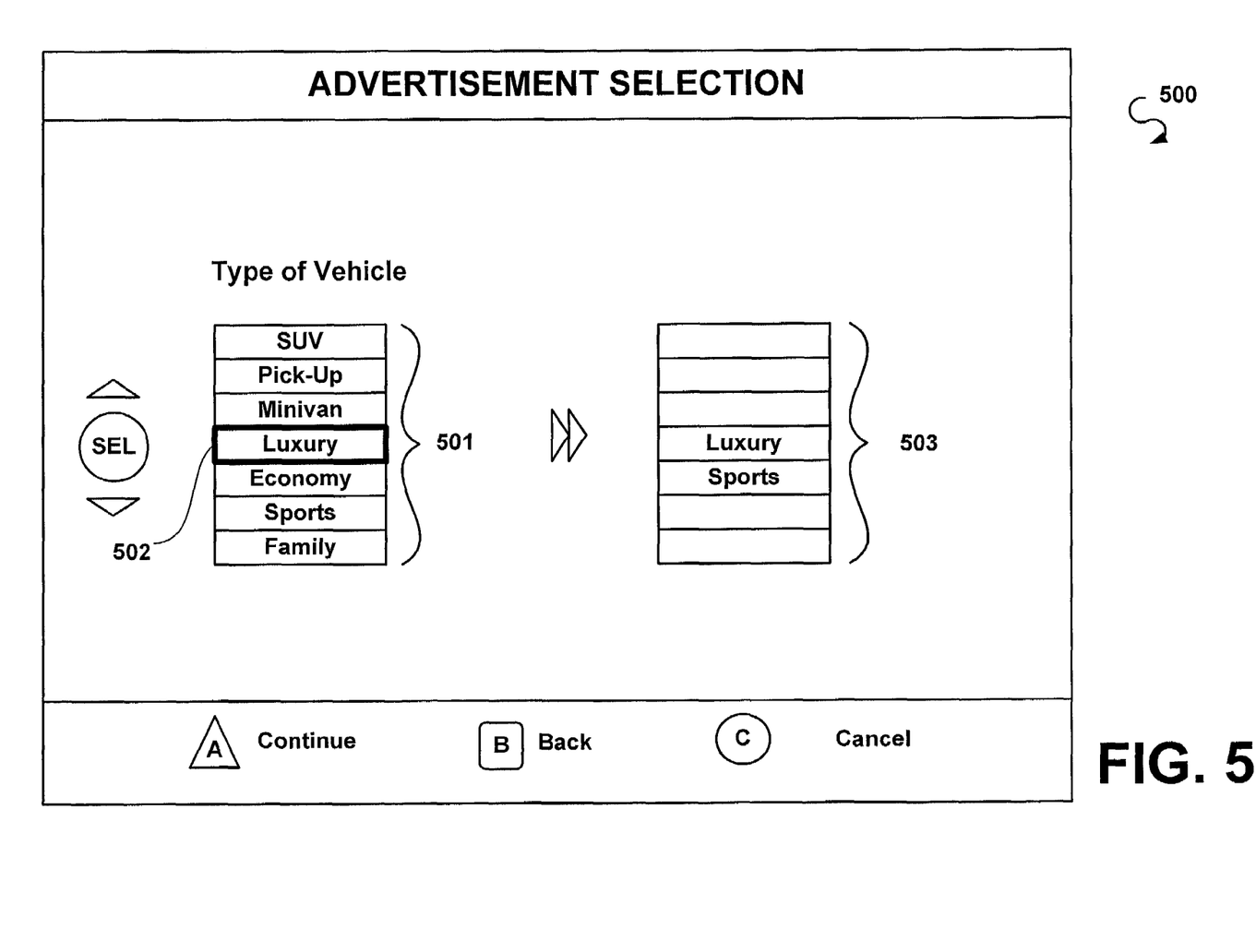
FIG. 5 depicts a non-limiting example of an advertisement sub-category selection screen which may, in one embodiment, be provided in response to the selection of an advertisement category via the advertisement category selection screen depicted in FIG. 4.

FIG. 5 depicts a non-limiting example of an advertisement sub-category selection screen 500 which may, in one embodiment, be provided in response to the selection of an advertisement category via the advertisement category selection screen 400 (FIG. 4). An advertisement sub-category menu 501 includes advertising sub-category options corresponding to the user selected category which, in this example, is "Cars and Trucks" 402 (FIG. 4). In one embodiment, if a user had selected multiple categories via the category selection screen 400, then the sub-category menu may include options corresponding to respective sub-categories. In an alternative embodiment, the user may be provided with multiple sub-category menus in succession, where each sub-category menu corresponds to one of the multiple categories that were selected via the category selection screen 400. Advertisement sub-category options may be used to determine user preferences in relation to a specific category of advertisements (e.g., cars and trucks). Advertisement sub-category options corresponding to the cars and trucks category 402 may include, for example, SUV, pick-up, minivan, luxury, economy, sports, and family. A user may provide user input in order to select one or more sub-categories form the sub-category menu 501.

Figure 6:
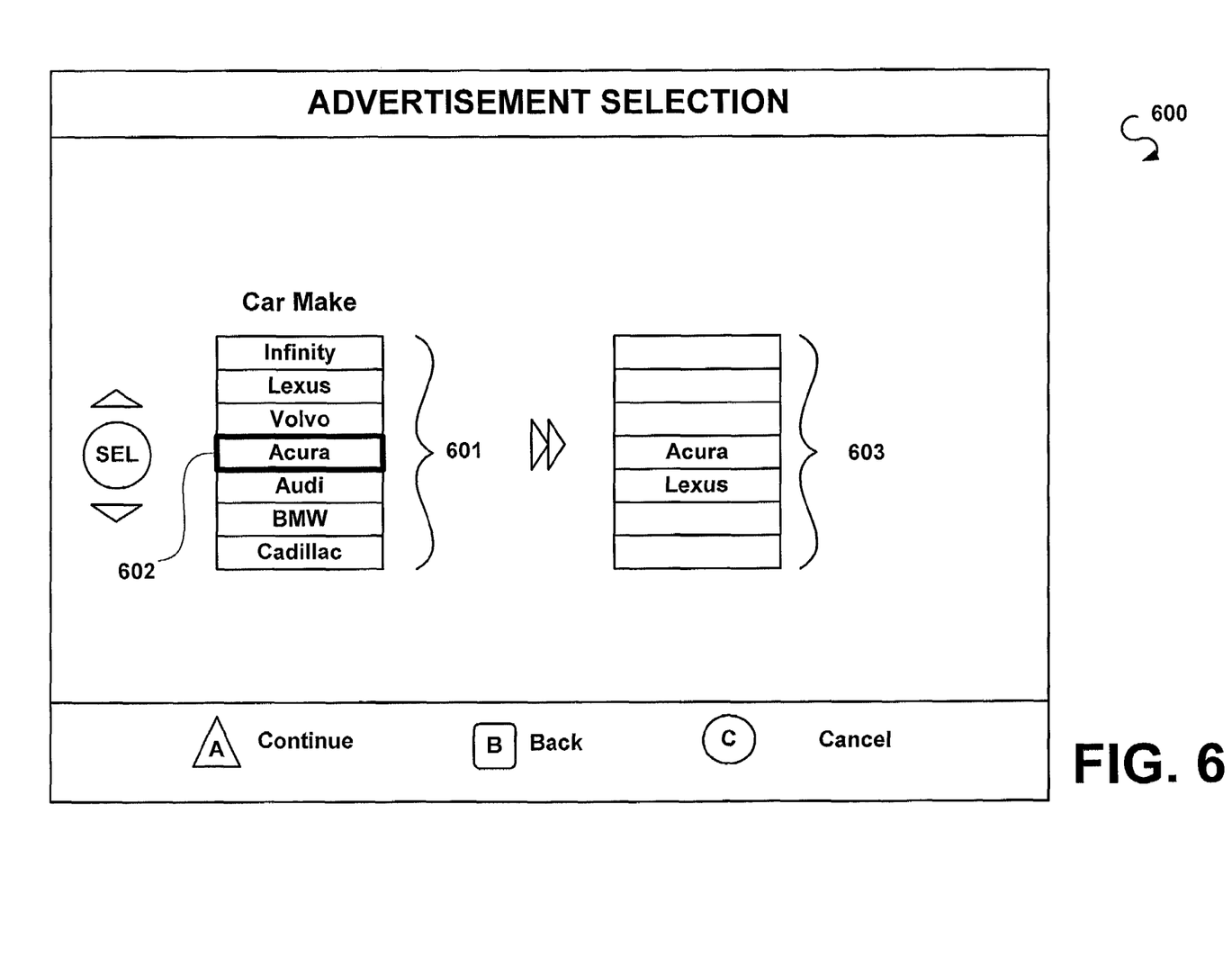
FIG. 6 depicts a non-limiting example of an advertisement source selection screen which may be provided in response to the selection of an advertisement sub-category via the advertisement sub-category selection screen depicted in FIG. 5.

FIG. 6 depicts a non-limiting example of an advertisement source selection screen 600 which may be provided in response to the selection of an advertisement sub-category via the advertisement sub-category selection screen 500 (FIG. 5). In an alternative embodiment, the advertisement source selection screen 600 may be provided in response to the selection of the cars and trucks option 402 via the advertisement category selection screen 400 (FIG. 4). An advertisement source menu 601 includes advertising source options corresponding to the user selected sub-category which, in this example, is luxury (cars & trucks) 502 (FIG. 5). Advertisement source options may be used to determine user preferences in relation to a source or name-brand for a certain type of products. Advertising source options corresponding to the luxury cars and trucks option 502 may include, for example, Infinity, Lexus, Volvo, Acura, Audi, BMW, and Cadillac, among others.

Figure 7:
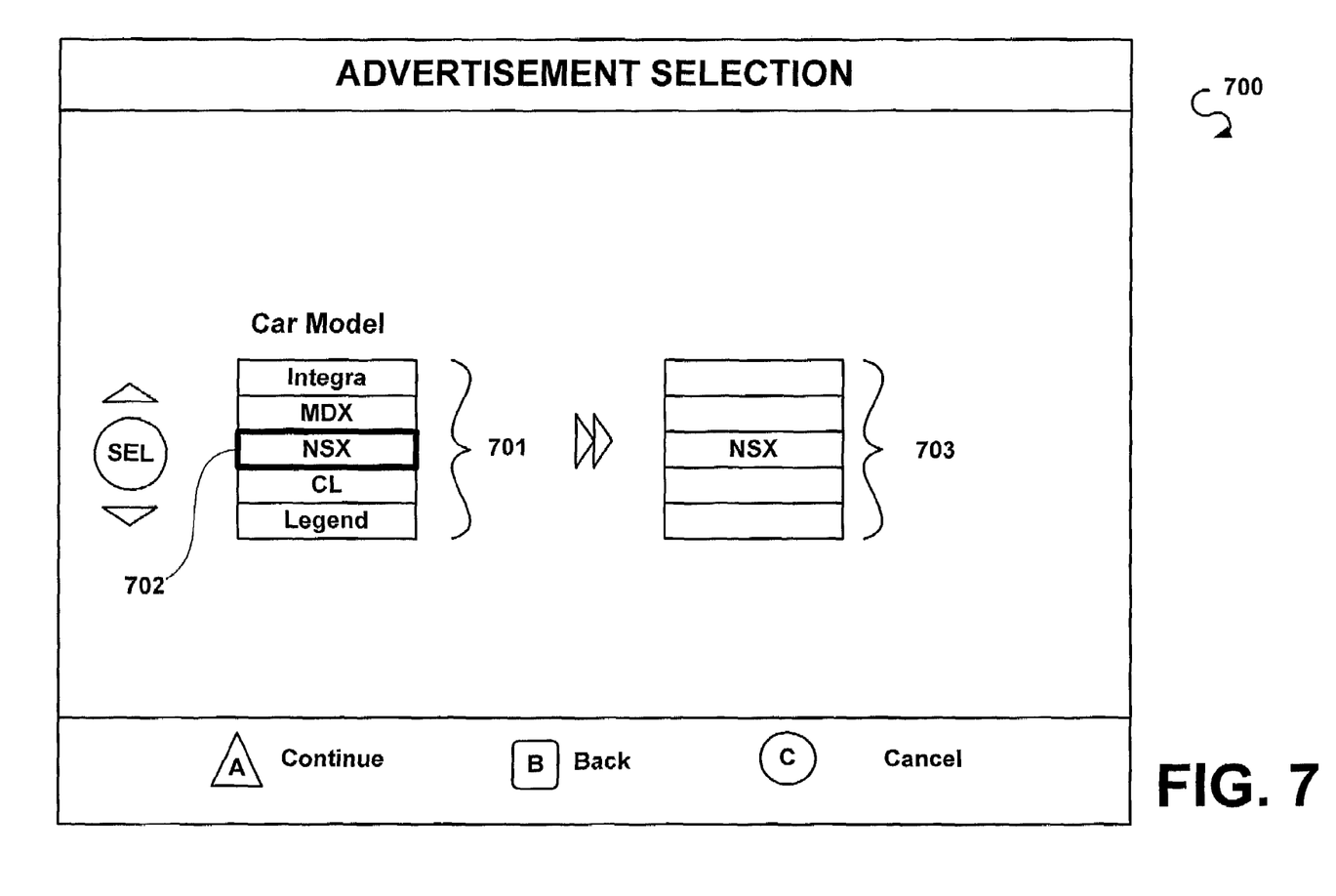
FIG. 7 depicts a non-limiting example of a product preference selection screen which may be provided in response to the selection of an advertisement source option via the advertisement source selection screen depicted in FIG. 6.

FIG. 7 depicts a non-limiting example of a product preference selection screen 700 which may be provided in response to the selection of an advertisement source option via the advertisement source selection screen 600 (FIG. 6). A product preference menu 701 includes product preference options corresponding to the user selected advertisement source which, in this example, is Acura 602 (FIG. 6). Product preference options may be used to determine user preferences in relation to a specific product. Product preference options corresponding to the Acura option 602 may include, for example, the following Acura models: Integra, MDX, NSX, CL, and Legend.

Figure 8:
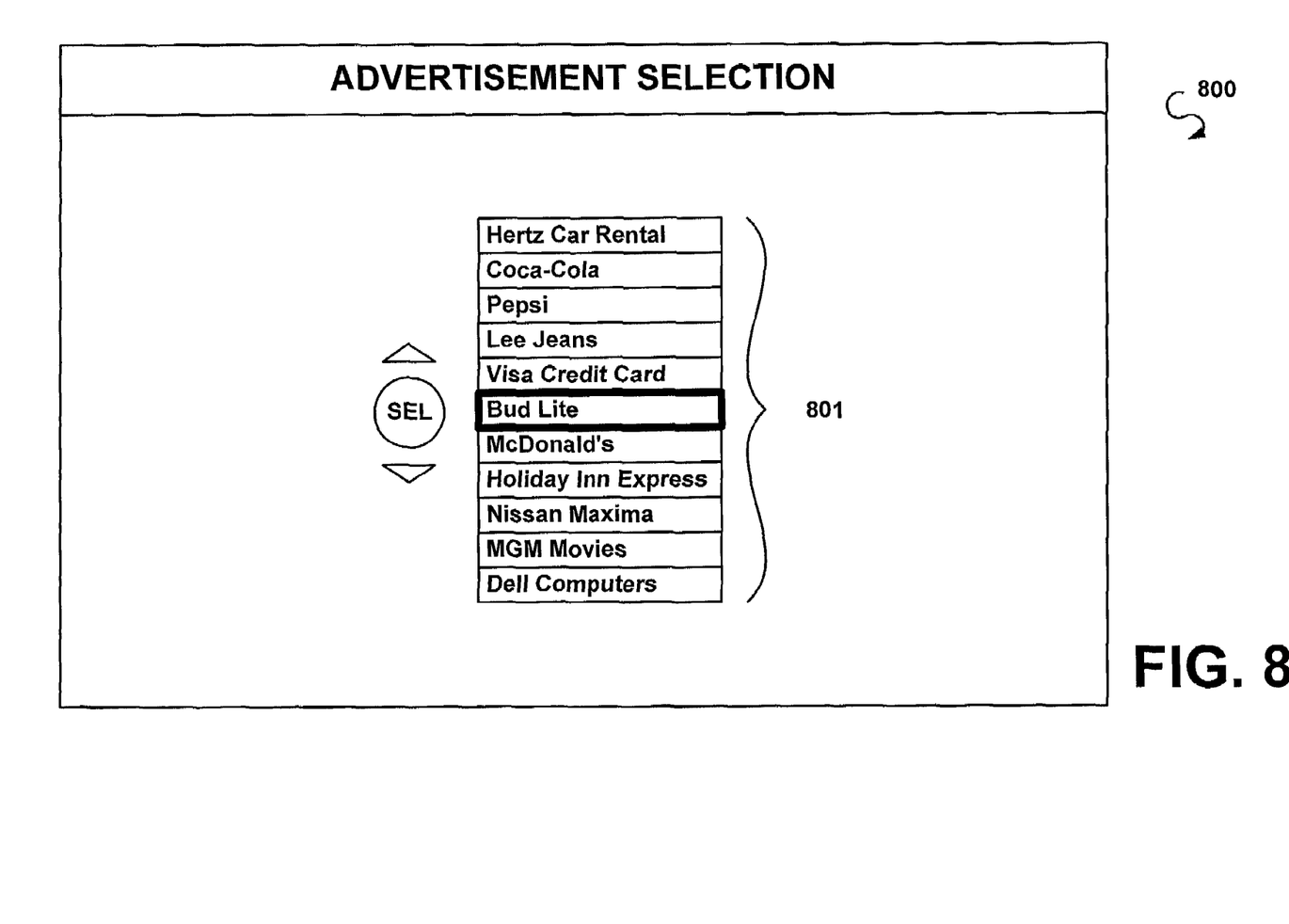
FIG. 8 depicts a non-limiting example of an advertisement selection screen which may be provided during a television presentation.

FIG. 8 depicts a non-limiting example of an advertisement selection screen 800 which may be provided during a television presentation. The television presentation may be, for example, a television program, a video-on-demand presentation, or a pay-per-view presentation. In one embodiment, the advertisement selection screen 800 may be provided to a user in response to a specified user input such as, for example, the activation of the "ADS" key 395 (FIG. 3). An advertisement menu 801 includes advertisement options corresponding to products and services that may be advertised via the DHCT 200. A user may select an advertisement option in order to be presented with a corresponding advertisement. In one embodiment, a user may select several advertisements options before being presented the corresponding advertisements. This may achieved by, for example, providing the user with feedback that identifies the options that are currently selected. The feedback may be in the form of an icon, a background color, and/or text that is associated with a selected option. After selecting the desired advertisement options, the user may then provide input that initiates the presentation of the selected advertisements. In another embodiment of the invention, a value is associated with each of the advertisements. The value of an advertisement may be identified via an icon, a background color, and/or text that is associated with advertisement option. A user may be required to view, over a certain period of time, a number of advertisements that have a certain total value. Alternatively, a user may be rewarded for viewing advertisements having a relatively high total value by being presented with shorter and/or fewer advertisements and/or advertisement interruptions.

Figure 9:
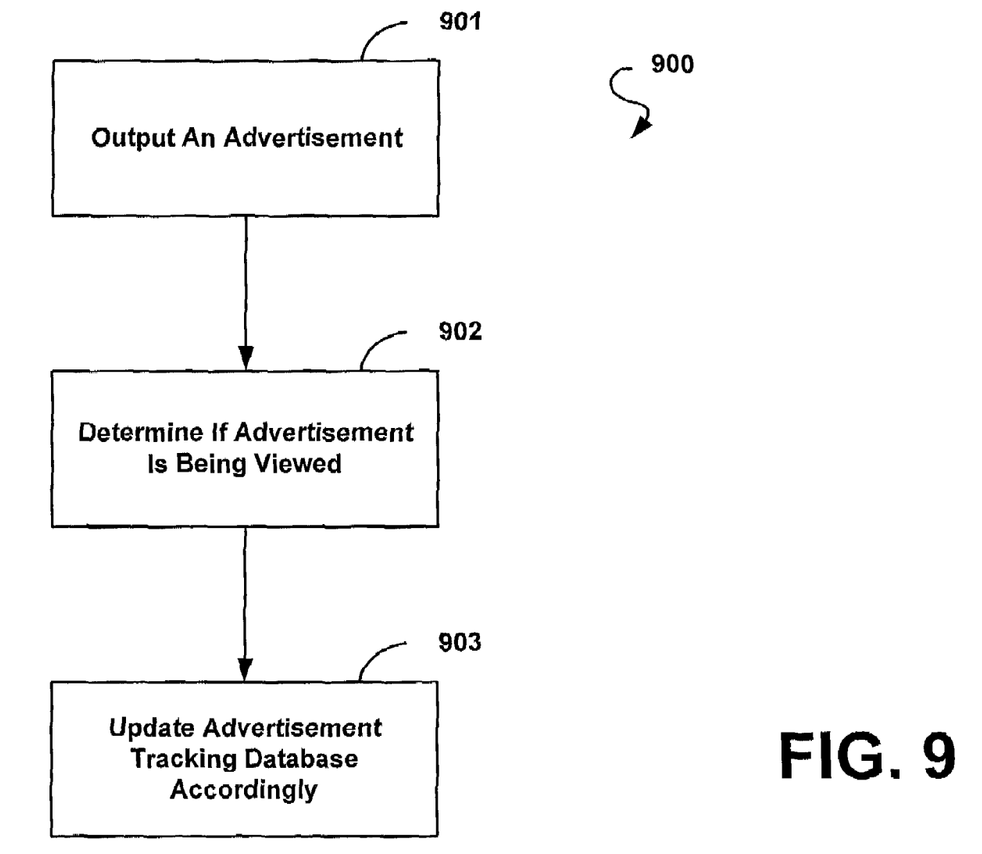
FIG. 9 is a flow chart depicting a non-limiting example of steps for tracking the presentation of advertisements in accordance with one embodiment of the invention.

FIG. 9 is a flow chart 900 depicting a non-limiting example of steps for tracking the presentation of advertisements in accordance with one embodiment of the invention. In step 901, the DHCT 200 outputs an advertisement. Then, in step 902, the DHCT 200 determines whether the advertisement has been or is being viewed. The determination may be based on viewer input that is solicited by the DHCT 200 during, before, and/or after the presentation of the advertisement. In another embodiment, the determination may be based on whether the television is turned on during the presentation of the advertisement. A television may be determined to be turned on if, for example, certain user input related to the operation of the television (e.g., volume control, channel navigation, among others) had been received by the DHCT 200 within a preceding predetermined period of time. In yet another embodiment, step 902 is not implemented, and step 903 is performed after step 901.

After the DHCT 200 determines whether an advertisement has been or is being viewed, then the DHCT 200 in step 903 updates an advertisement tracking database accordingly. The advertising tracking database keeps track of the number, value, type and/or identity of the advertisements that were viewed by a household, and may be used to determine which advertisements to present to a user. For example, if an advertisement is viewed more than a certain number of times by a certain household, then it would no longer be presented by a DHCT 200 to that household.

Figure 10:
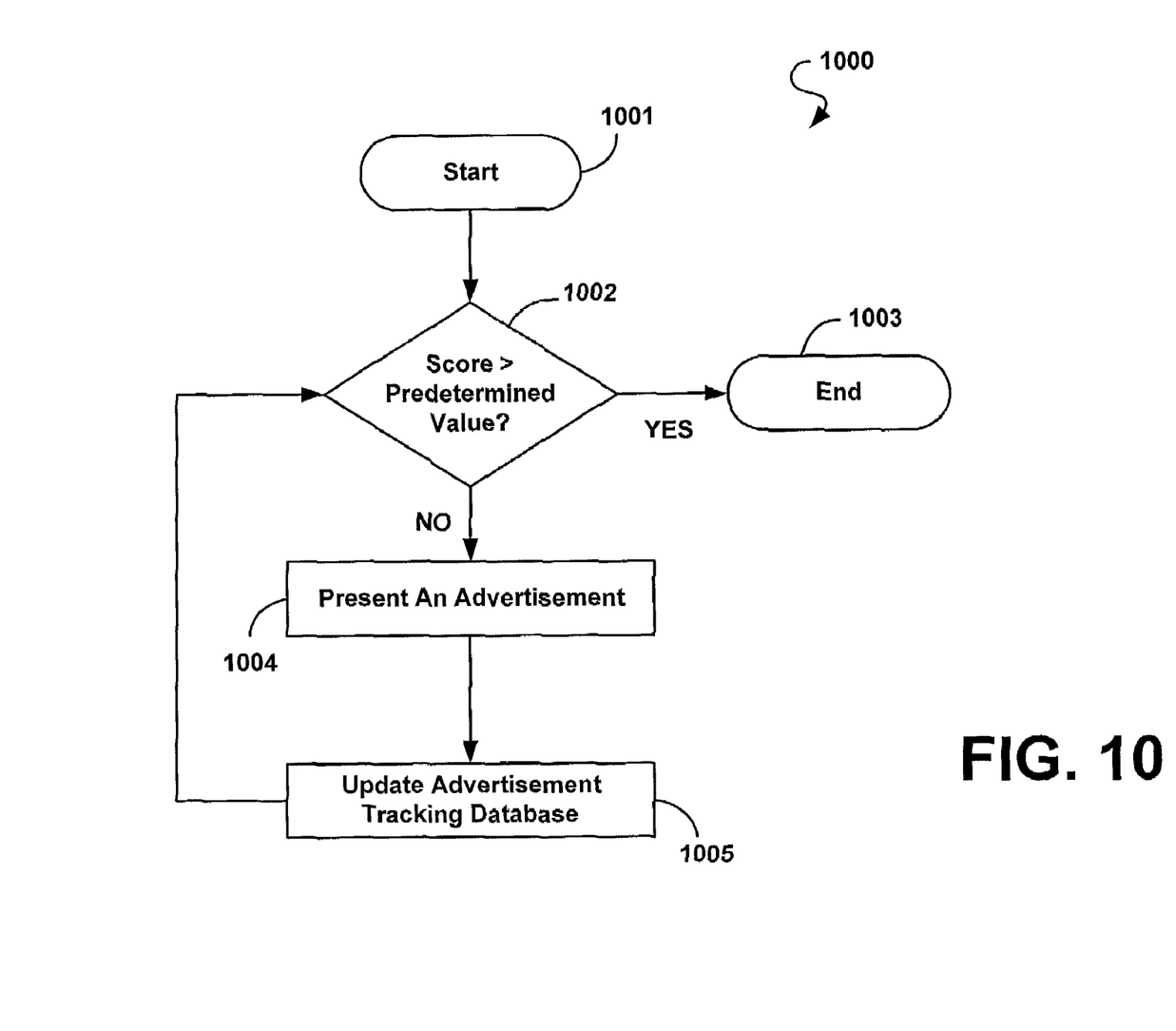
FIG. 10 is flow chart depicting a non-limiting example of a routine that may be used to determine a number of advertisements that are presented to a user.

FIG. 10 is flow chart depicting a non-limiting example of a routine 1000 that may be used to determine a number of advertisements that are presented to a user. The routine 1000 may be part of the advertisement management application 225. After the routine 1000 is initiated in step 1001, the routine 1000 determines in step 1002 whether an advertisement tracking score is greater than a predetermined value. The advertisement tracking score reflects a value associated with advertisements that have been presented to a user over a certain time period immediately prior to the implementation of step 1002, and may be determined using an advertisement tracking database. If the score is greater that a predetermined value, then the routine 1000 terminates as indicated in step 1003. However, if the score is not greater than a the predetermined value, then the routine 1000 initiates in step 1004 the presentation of an advertisement. In one embodiment, the advertisement may be selected in accordance with previously determined user preferences. After the routine 1000 initiates the presentation of the advertisement, then the routine 1000, in step 1005 updates an advertisement tracking database based on the value that is associated with the advertisement that was presented to the user. In an alternative embodiment, the database is only updated if the routine 1000 determines that the advertisement was viewed. Such a determination may be based on, for example, whether certain user input was received during the presentation of the advertisement or whether the television was turned on. After step 1005, the routine 1000 then returns to step 1002 and determines once again whether the advertisement tracking score is greater than the predetermined value.

Figure 11:
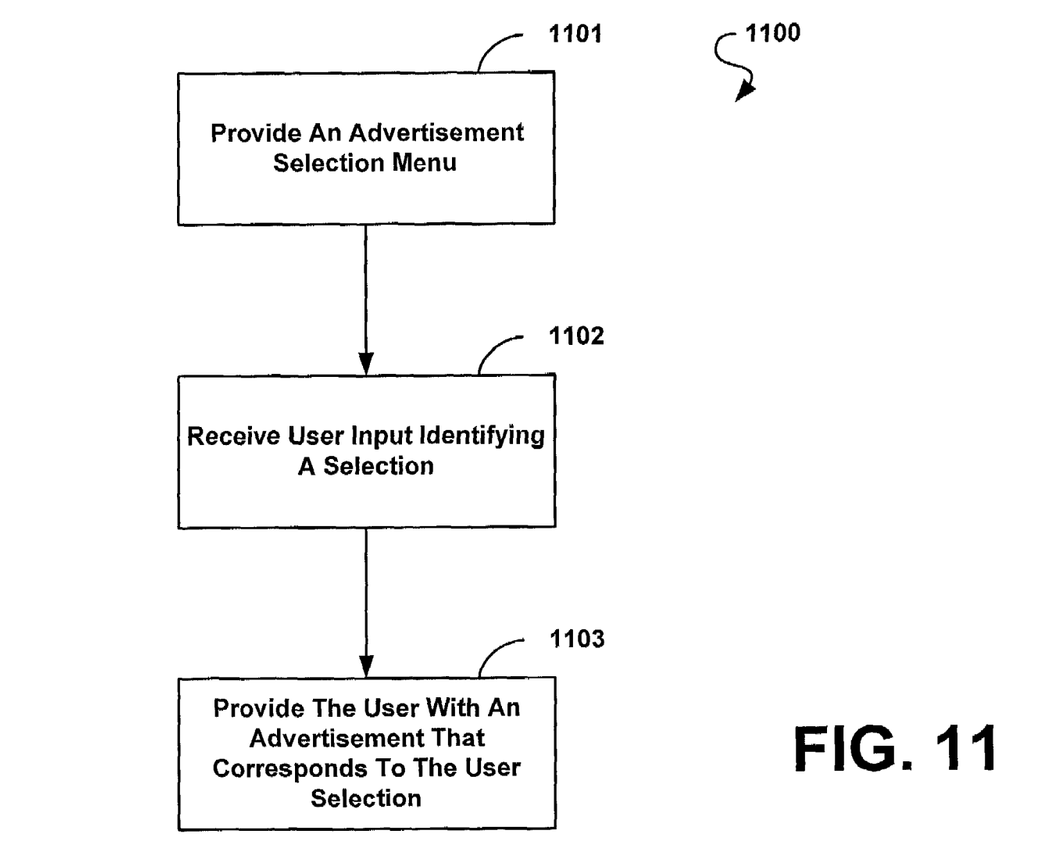
FIG. 11 is a flow chart depicting a non-limiting example of steps for providing a user with advertisements in accordance with one embodiment of the invention.

FIG. 11 is a flow chart 1100 depicting a non-limiting example of steps for providing a user with advertisements in accordance with one embodiment of the invention. In step 1101, the DHCT 200 provides the user with an advertisement selection menu. The advertisement selection menu may be provided during the provision of a video presentation (e.g. a television program or a VOD movie) or in response to user input requesting the menu. The menu may have selections that identify specific advertisements or that identify types of products, services, and/or their sources, as discussed above in reference to FIGS. 4-8. In step 902 the DHCT 200 receives user input identifying one or more selections from the advertisement selection menu. After the DHCT 200 receives the user input, it provides the user with one or more advertisements that correspond to advertisement selection(s) identified by the user input. In one embodiment of the invention, an advertisement corresponding to a user selection is provided immediately after the advertisement selection process is complete. In another embodiment of the invention, the user selection(s) is/are used to determine the advertisements that are intermittently presented to the user over an extended period of time.

Steps or blocks shown in each of the flow charts illustrated in FIGS. 9-11 represent modules, segments, or portions of code which include one or more executable instructions for implementing specific logical functions or steps in a process. Alternate implementations are included within the scope of the preferred embodiments of the present invention in which functions or steps may be executed out of order from that shown or discussed, including substantially concurrently or in reverse order, depending on the functionality involved, as would be understood by those reasonably skilled in the art.

It will be appreciated by those skilled in the art that the functionality provided by each of the flow charts illustrated in FIGS. 9-11 can also be implemented through hardware and supporting circuitry. Each implementation has its advantages, however. For example, hardware enjoys a speed and, arguably, a reliability advantage over software because hardware testing and verification methods are currently more advanced than software verification methods. On the other hand, software can be less expensive than customized hardware and offers greater flexibility in adding or modifying product features. It will be also be appreciated by those skilled in the art that the functionality provided by each of the flow charts illustrated in FIGS. 9-11 may be implemented in a combination of software and hardware.

Further, the functionality provided by each of the flow charts illustrated in FIGS. 9-11, can be embodied in any computer-readable medium for use by or in connection with a computer-related system (e.g., an embedded system such as a modem) or method. In this context of this document, a computer-readable medium is an electronic, magnetic, optical, semiconductor, or other physical device or means that can contain or store a computer program or data for use by or in connection with a computer-related system or method. Also, the computer program or data may be transferred to another computer-readable medium by any suitable process such as by scanning the computer-readable medium. Thus, the computer-readable medium could be paper or other suitable medium upon which the computer program can be printed, scanned with an optical scanning device, and transferred into the computer's memory or storage.

It should be emphasized that the above-described embodiments of the present invention, particularly any "preferred embodiments", are merely possible examples, among others, of the implementations, setting forth a clear understanding of the principles of the invention. Many variations and modifications may be made to the above-described embodiments of the invention without departing substantially from the principles of the invention. All such modifications and variations are intended to be included herein within the scope of the disclosure and present invention and protected by the following claims. In addition, the scope of the present invention includes embodying the functionality of the preferred embodiments of the present invention in logic embodied in hardware and/or software-configured mediums.

What is claimed is:

1. A method implemented by a television set-top terminal (STT) configured to provide television programs and a viewer's preference for advertisement categories, the method comprising:

outputting to a television by the STT a graphical user interface (GUI) that comprises a menu having a plurality of viewer selectable advertisement categories, said plurality of viewer selectable advertisement categories including a first advertisement category and a second advertisement category that is different from the first advertisement category;

receiving by the STT a first viewer input corresponding to the first advertisement category and a second viewer input corresponding to the second advertisement category;

responsive to receiving the first and second viewer inputs, storing the first and second advertisement categories in the memory of the STT configured to store the viewer's preference for advertisement categories;

receiving a first advertisement and a second advertisement by the STT from a remote server after the STT receives the first and second viewer inputs;

storing the first and second advertisements in the STT;

receiving at a future time, a television program by a tuner in the STT;

outputting the television program to the television by the STT; and outputting the stored first and second advertisements to the television by the STT during an interruption in the presentation of the television program being output by the STT.

2. The method of claim 1, further comprising:
outputting the first and second advertisements to a television only during time periods that were defined prior to receiving the first and second viewer inputs.

3. The method claim 1, further comprising:
receiving by the STT a third viewer input responsive to a request by the STT for the third viewer input during the presentation of at least a portion of at least one of the first and second advertisements.

4. The method of claim 1, wherein the second advertisement is output to the television during interruptions of the presentation of a television programs having predetermined program categories.

5. The method of claim 1, wherein the first and second advertising categories are subcategories that correspond to respective broader categories.

6. The method of claim 1, further comprising:
deleting at least one of the first and second advertisements from the STT after a corresponding predetermined expiration time.

7. The method of claim 1, further comprising:
deleting at least one of the first and second advertisements from the STT responsive to determining that said at least one of the first and second advertisements has been viewed at least a predetermined number of times.

8. The method of claim 1, further comprising:
determining by the STT a number of times that at least one of the first and second advertisements has been viewed responsive to receiving viewer inputs while the STT is outputting said at least one of the first and second advertisements.

9. The method of claim 1, wherein the advertisement comprises a commercial.

10. The method of claim 1, wherein the menu further comprises selectable advertisements.

11. A television set-top terminal (STT) system, comprising:

STT logic configured to output to a television a graphical user interface (GUI) that comprises a menu having a plurality of selectable advertisement categories, receive a plurality of viewer inputs respectively corresponding to selections made from the menu having the plurality of selectable advertisement categories, responsive to receiving the plurality of viewer inputs, store in a memory of the STT the viewer-selected advertisement categories, after receiving the plurality of viewer inputs, receive advertisement data components corresponding exclusively to respective advertisements corresponding to the viewer selected advertisement categories, store the advertisement data components in the memory of the STT, and output the respective advertisements to the television during intermittent future interruptions of the presentation of television programs not yet received at the STT output to the television at a future time.

12. The system of claim 11 wherein the STT logic is further configured to output to the television advertisements only during interruptions of television programs having predetermined program categories.

13. The system of claim 11, wherein the STT logic is further configured to delete the advertisement data components from the STT after a predetermined expiration time.

14. The system of claim 11, wherein the STT logic is further configured to delete each of the advertisement data components from the STT responsive to determining that the respective corresponding advertisements has been viewed at least a predetermined number of times.

15. The system of claim 11, wherein the advertisements comprise commercials.

16. The system of claim 11, wherein the menu further comprises selectable advertisements.

17. A method implemented by a television set-top terminal (STT), comprising:
  outputting to a television by the STT a graphical user interface (GUI) that comprises a menu having a plurality of viewer-selectable advertisement categories;
  receiving by the STT a plurality of viewer inputs respectively corresponding to viewer-selected advertisement categories from the plurality of selectable advertisement categories, wherein the viewer inputs are provided by a viewer of the television; and
  responsive to receiving the plurality of viewer inputs, outputting to the television by the STT a plurality of commercials respectively corresponding to at least one of the viewer-selected advertisement categories;
  receiving a first advertisement and a second advertisement by the STT from a remote server after the STT receives the first and second viewer inputs;
  storing the first and second advertisements in the STT;
  receiving at a future time, a television program by a tuner in the STT;
  outputting the television program to the television by the STT; and
  outputting the stored first and second advertisement to the television by the STT during an interruption in the presentation of the television program being output by the STT.

18. The method of claim 17, wherein the plurality of commercials are received by the STT from a remote server after receiving the plurality of viewer inputs.

19. The method of claim 17, wherein the plurality of commercials are output to the television at intermittent future times.

20. The method of claim 19, wherein the plurality of commercials are output by the STT to the television during respective interruptions in television programs being output by the STT.

21. The method of claim 20, wherein the plurality of commercials are output by the STT to the television only during interruptions of television programs having predetermined respective types.

22. The method of claim 17, wherein the plurality of commercials output by the STT correspond exclusively to commercials respectively corresponding to at least one of the viewer-selected advertisement categories.

23. The method of claim 17, further comprising outputting to the television by the STT a plurality of advertisements.

24. The method of claim 17, wherein the menu further comprises selectable commercials, selectable advertisements, or a combination of selectable commercials and selectable advertisements.

* * * * *